US011059724B2

(12) United States Patent
Yi et al.

(10) Patent No.: US 11,059,724 B2
(45) Date of Patent: Jul. 13, 2021

(54) POROUS MATERIAL AND PREPARATION METHODS THEREOF, AND ANODES AND DEVICES INCLUDING THE SAME

(71) Applicant: NINGDE AMPEREX TECHNOLOGY LIMITED, Ningde (CN)

(72) Inventors: Ting Yi, Ningde (CN); Chengbo Zhang, Ningde (CN); Hang Cui, Ningde (CN); Yuansen Xie, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 7 days.

(21) Appl. No.: 16/528,242

(22) Filed: Jul. 31, 2019

(65) Prior Publication Data
US 2020/0399133 A1 Dec. 24, 2020

(30) Foreign Application Priority Data
Jun. 18, 2019 (CN) .......................... 201910526482.7

(51) Int. Cl.
*C01B 33/20* (2006.01)
*C01B 33/22* (2006.01)
(Continued)

(52) U.S. Cl.
CPC .......... *C01B 33/2876* (2013.01); *C01B 33/20* (2013.01); *C01B 33/22* (2013.01);
(Continued)

(58) Field of Classification Search
CPC . C01B 33/2807; C01B 33/2876; C01B 33/20; C01B 33/22; C01P 2004/61; C01P 2004/62; C01P 2006/16; C01P 2006/40
See application file for complete search history.

(56) References Cited

U.S. PATENT DOCUMENTS

2014/0234535 A1* 8/2014 Lee ....................... H01M 4/587
427/122

FOREIGN PATENT DOCUMENTS

| CN | 1667855 A | 9/2005 |
|----|-----------|--------|
| CN | 103073017 A | 5/2013 |

(Continued)

OTHER PUBLICATIONS

Liu et al, "Interpenetrated 3D porous silicon as high stagle anode material for Li-ion battery", Journal of Power Sources, 406 (2018) 167-175 (Year: 2018).*

(Continued)

*Primary Examiner* — David M Brunsman
(74) *Attorney, Agent, or Firm* — Juan Carlos A. Marquez; Marquez IP Law Office, PLLC (57) ABSTRACT

The present application relates to a porous material and preparation methods thereof, and anodes and devices including the same. The porous material provided by the present application includes a material of the formula $Si_aM_bO_x$, wherein the ratio of x to a is about 0.6 to about 1.5, and the ratio of a to b is about 8 to about 10,000, wherein M includes at least one selected from the group consisting of Al, Si, P, Mg, Ti and Zr. The anode and an electrochemical device including the porous material exhibit higher rate performance, higher first coulombic efficiency, higher cycle stability and lower cycle expansion ratio.

16 Claims, 3 Drawing Sheets (51) Int. Cl.
*C01B 33/26* (2006.01)
*H01M 4/1395* (2010.01)
*H01M 10/0525* (2010.01)

(52) U.S. Cl.
CPC ....... *C01B 33/2807* (2013.01); *H01M 4/1395* (2013.01); *H01M 10/0525* (2013.01); *C01P 2002/01* (2013.01); *C01P 2002/72* (2013.01); *C01P 2002/80* (2013.01); *C01P 2004/41* (2013.01); *C01P 2004/61* (2013.01); *C01P 2004/62* (2013.01); *C01P 2006/16* (2013.01); *C01P 2006/40* (2013.01)

(56) References Cited

FOREIGN PATENT DOCUMENTS

| | | |
|---|---|---|
| CN | 103633305 A | 3/2014 |
| CN | 107628622 A | 1/2018 |
| CN | 107768618 A | 3/2018 |
| CN | 108292745 A | 7/2018 |
| CN | 108615854 A | 10/2018 |
| CN | 109103443 A | 12/2018 |
| CN | 109417163 A | 3/2019 |
| CN | 109449423 A | 3/2019 |
| CN | 109455723 A | 3/2019 |
| CN | 109755500 A | 5/2019 |

OTHER PUBLICATIONS

Alfonsetti et al, "XPS studies on SiOx thin films", Applied Surface Science, (Jun. 1993) 70/71 222-225 (Year: 1993).*
International Search Report dated Mar. 23, 2020 in counterpart PCT application PCT/CN2019/123342, 5 pages.
PCT Written Opinion dated Mar. 23, 2020 in counterpart PCT application PCT/CN2019/123342, 5 pages.
"A Nanostructured SiAl0.2O Anode Material for Lithium Batteries," Jeong et al., Chem. Mater., No. 19, vol. 22, Sep. 3, 2010. pp. 5570-5579.
Chinese First Office Action dated Aug. 19, 2020 in counterpart Chinese application CN201910526482.7, 10 pages in Chinese.
"Development of Silicon Suboxide Anodes for Lithium-ion Batteries," Wu et al., Journal of the Chinese Ceramic Society, vol. 46, No. 11, Nov. 30, 2018, pp. 1645-1652 in Chinese with 1-page English abstract.
"Reduced graphene-oxide/highly ordered mesoporous SiOx hybrid material as an anode material for lithium ion batteries," Liu et al., Electrochimica Acta 273 (2018), Apr. 6, 2018, pp. 26-33 in English.

* cited by examiner

POROUS MATERIAL AND PREPARATION METHODS THEREOF, AND ANODES AND DEVICES INCLUDING THE SAME

CROSS REFERENCE TO RELATED APPLICATIONS

The present application claims the benefit of priority from the China Patent Application No. 201910526482.7, filed on 18 Jun. 2019, the disclosure of which is hereby incorporated by reference in its entirety.

BACKGROUND

1. Technical Field

The present application relates to the energy storage field, and in particular to a porous material and preparation methods thereof, and anodes and devices including the same.

2. Description of the Related Art

With the popularity of electronic products such as notebook computers, mobile phones, handheld game consoles and tablet computers, the requirements for electrochemical devices (for example, batteries) are more and more stringent. Among various batteries, lithium ion batteries have the advantages of high energy storage density, high power density, good safety, environmental friendliness, long service life, low self-discharge rate and wide temperature adaptation range as compared with lead-acid batteries, nickel-cadmium batteries and nickel-hydrogen batteries. As an important part of lithium ion batteries, anode materials have significant impact on the performance of the lithium ion batteries, so the continuous optimization and improvement of the anode materials is particularly important.

SUMMARY

One direction for lithium ion battery technology innovation is to continuously increase energy density. At present, the actual capacity of mainstream graphite materials is close to the theoretical capacity (372 mAh/g), and there is already a bottleneck in increasing energy density. Silicon-based anode materials have received much attention and research due to abundant reserves, ultrahigh theoretical capacity (4200 mAh/g), and environmental friendliness. However, the volume expansion problem (300% or above) of the silicon-based anode material during cycling seriously affects the industrial application potential for silicon-based anode material. As an optimization direction for silicon-based anode materials, silicon-oxygen materials have been extensively studied as providing reversible capacity of 1300 mAh/g and significantly mitigating volume expansion (which can reduce volume expansion to 118%). However, the expansion of the silicon-oxygen materials needs further improvement in reduction.

According to a first aspect of the present application, the present application provides a porous material, including a material with the formula $Si_aM_bO_x$, wherein the ratio of x to a is about 0.6-about 1.5, and the ratio of a to b is about 8-about 10,000, wherein M includes at least one selected from the group consisting of Al, Si, P, Mg, Ti and Zr.

The doped $Si_aM_bO_x$ material having a microporous and/or mesoporous structure in the present application has higher first coulombic efficiency, better rate performance, and a lower battery expansion ratio during cycling, mainly because the microporous and/or mesoporous structure can provide space for expansion of the material during the cycle, and can inhibit the reaction of the organic macromolecules in the electrolyte with Si inside the material, which can effectively improve the reversible capacity during the reaction, and nanocrystallization of the microporous material is beneficial to the diffusion of Li ions and significantly improves the rate performance of the silicon-oxygen material; and doping can improve the structural stability of the material.

In some embodiments, wherein the pore size of pores of the material is between about 0.5 nm and about 50 nm.

In some embodiments, wherein the $Si_aM_bO_x$ is mainly present in the form of at least one of a tetrahedron, a hexahedron and an octahedron formed by Si—Si, Si—O-M and M-M chemical bonds.

In some embodiments, wherein the $Si_aM_bO_x$ consists essentially of Si, $SiO_2$ and $MO_x$, wherein $MO_x$ is mainly present in an amorphous form.

In some embodiments, wherein the particle size of the $Si_aM_bO_x$ is about 200 nm-about 3 μm.

In some embodiments, wherein the ratio of a to b is about 9-about 100.

In some embodiments, wherein the ratio of a to b is about 10-about 25.

According to a second aspect of the present application, the present application provides a method for preparing any of the foregoing porous materials, including:

step 1: mixing a silicon source with an organic template to obtain a first solution;

step 2: mixing a doping element precursor with deionized water to obtain a second solution, and adding the second solution dropwise to the first solution to obtain a third solution;

step 3: placing the third solution in a reaction vessel for a hydrothermal reaction for about 1 day-about 5 days, and drying and calcining the hydrothermal reaction product;

step 4: mixing the calcined product of step 3 with magnesium powder, and calcining the mixture under an inert atmosphere; and step 5: performing acid-washing, water-washing, vacuum-drying and sieving of the calcined product of step 4 to obtain $Si_aM_bO_x$, wherein the masses of the silicon source, the doping element precursor and the magnesium powder are selected to meet the base stoichiometric ratio of the $Si_aM_bO_x$ as described in any of the foregoing, and wherein the mass of the organic template is selected to meet the particle size range and pore size range of the $Si_aM_bO_x$ as described in any of the foregoing.

In some embodiments, wherein the organic template includes at least one selected from the group consisting of tetrapropylammonium hydroxide, tetramethylammonium hydroxide, tetraethylammonium hydroxide, triethylamine, polyethylene oxide-polypropylene oxide-polyethylene oxide triblock copolymer, tetrapropylammonium bromide, hexamethylenediamine and amantadine.

In some embodiments, the mass ratio of the hydrothermal reaction product to the magnesium powder is about 1:0.2 to about 1:0.8.

In some embodiments, wherein, the silicon source in step 1 includes at least one selected from the group consisting of tetraethyl orthosilicate, sodium silicate, tetramethoxysilane, polysiloxane, silica and the like;

the first solution and the third solution in step 1 and step 2 are stirred at about 20° C.-about 45° C. for about 0.5 h-about 6 h;

the doping element precursor in step 2 includes at least one selected from the group consisting of aluminum isopropoxide, aluminum hydroxide, tetraethyl ortho silicate, titanium tetraisopropanolate, phosphoric acid, magnesium sulfate, zirconium n-butoxide, zirconium isopropoxide and the like;

the temperature of the hydrothermal reaction in step 3 is 160° C.-about 200° C., and the hydrothermal reaction product is dried, placed in a calcining furnace, heated at a heating rate of about 0.1° C./min-about 3° C./min to about 550° C.-about 700° C. and calcined for about 2 h-about 24 h;

the inert atmosphere in step 4 is nitrogen, argon or helium, and a mixture of the calcined product of step 3 and the magnesium powder is placed in the calcining furnace, heated at a heating rate of about 0.1° C./min-about 3° C./min to about 550° C.-about 700° C. and calcined for about 2 h-about 24 h; and the acid-washing in step 5 is performed by immersing the calcined product of step 4 in about 0.1M-about 2M hydrochloric acid for about 5 h-about 24 h and about 400 mesh is adopted for the sieving.

According to a third aspect of the present application, the present application provides an anode, including an anode current collector and an anode active material layer disposed on at least one surface of the anode current collector, wherein the anode active material layer includes the material according to any of the foregoing porous materials.

According to a fourth aspect of the present application, the present application provides an electrochemical device, including a cathode, a separator, an electrolyte and the foregoing anode.

BRIEF DESCRIPTION OF THE DRAWINGS

The drawings show certain embodiments of the present application and are used to further understand the technical subject matter of the present application together with the above description. However, the scope of protection claimed by the present application shall not be limited to the drawings.

DETAILED DESCRIPTION

The present application will be described below in detail. It shall be understood that the terms used in the specification and the appended claims should be explained according to the meanings and concepts corresponding to the technical aspects of the present application based on the principle that the inventors are allowed for optimal explanation with properly defined terms, rather than being limited to the general meanings and the meanings of the dictionary. Therefore, the descriptions in the embodiments and the accompanying drawings in the specification are only specific instances for the purpose of illustration, without intending to show all technical aspects of the present application, and it should be understood that multiple optional equivalents and variants can be made to the present application when the present application is submitted. As used herein, the terms "substantially", "generally", "essentially" and "about" are used to describe and explain small variations. When used in connection with an event or circumstance, the terms may refer to an example in which the event or circumstance occurs precisely and an example in which the event or circumstance occurs approximately. For example, when used in connection with a value, the terms may refer to a range of variation less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, less than or equal to ±0.05%, etc. For example, if the difference value between the two values is less than or equal to ±10% of the average of the values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), then the two values can be considered "substantially" the same.

In the detailed description and the claims, a list of items joined by the term "one of" can mean any of the listed items. For example, if items A and B are listed, then the phrase "one of A and B" means A only or B only. In another example, if items A, B and C are listed, then the phrase "one of A, B and C" means A only; B only; or C only. Item A can include a single element or multiple elements. Item B can include a single element or multiple elements. Item C can include a single element or multiple elements.

In the detailed description and the claims, a list of items joined by the term "at least one of" can mean any combination of the listed items. For example, if items A and B are listed, then the phrase "at least one of A and B" means A only; B only; or A and B. In another example, if items A, and C are listed, then the phrase "at least one of A, B and C" means A only; B only; C only; A and B (excluding C); A and C (excluding B); B and C (excluding A); or all of A, B, and C. Item A can include a single element or multiple elements. Item B can include a single element or multiple elements. Item C can include a single element or multiple elements. In addition, quantities, ratios, and other values are sometimes presented in a range format herein. It should be understood that the range format of the present application is intended for convenience and briefness and should be understood flexibly. Not only are the values explicitly limited in the range contained, but also all individual values or sub-ranges covered within the range are contained as each value and each sub-range are explicitly specified.

I. Porous Material

The present application provides a porous material, including a material of formula $Si_aM_bO_x$, wherein the ratio of x to a is about 0.6-about 1.5, and the ratio of a to b is about 8-about 10,000, wherein M includes at least one selected from the group consisting of Al, Si, P, Mg, Ti and Zr.

Figure 3:
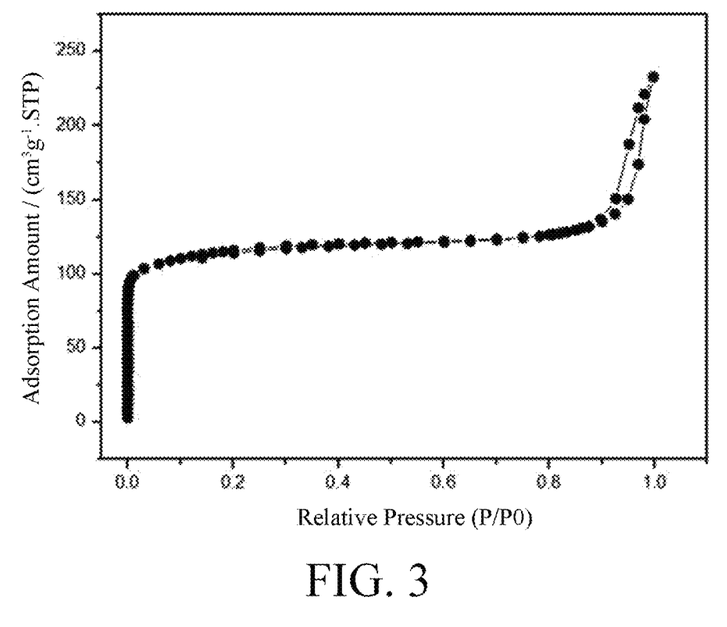
FIG. 3 is an $N_2$ adsorption/desorption isotherm diagram of the porous material of Embodiment 2.

In some embodiments, the pore size of pores of the material is between about 0.5 nm and about 50 nm. In some embodiments, the pore size of the pores of the material may be about 1.0 nm, about 6.0 nm, about 11.0 nm, about 16.0 nm, about 21 nm, about 26 nm, about 31 nm, about 36 nm, about 41 nm, about 46 nm, and the like. In some embodiments, the pore size of the pores of the material is between about 0.8 nm and about 20 nm. In some embodiments, the pore size of the pores of the material may be about 0.9 nm to about 13 nm. Refer to FIG. 3, which is an $N_2$ adsorption/desorption isothermal diagram of the porous material of Embodiment 2. In the pressure section of $10^{-6}<P/P_0<0.01$, a rapid adsorption phase is included, which demonstrates the presence of the microporous structure (i.e., pores with a pore size of less than 2 nm) in the material, and a hysteresis loop at the pressure section of $0.8<P/P_0<1$ demonstrates the presence of the mesoporous structure (i.e., pores with a pore size of 2 nm to 50 nm) in the material.

Figure 1:
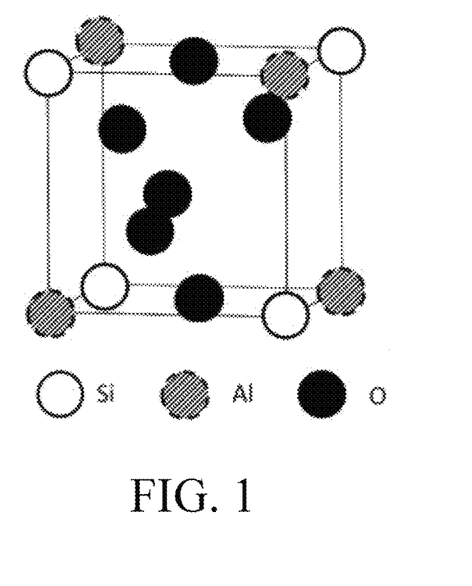
FIG. 1 is a molecular structure model diagram of a porous material $Si_aM_bO_x$ of the present application.
Figure 2:
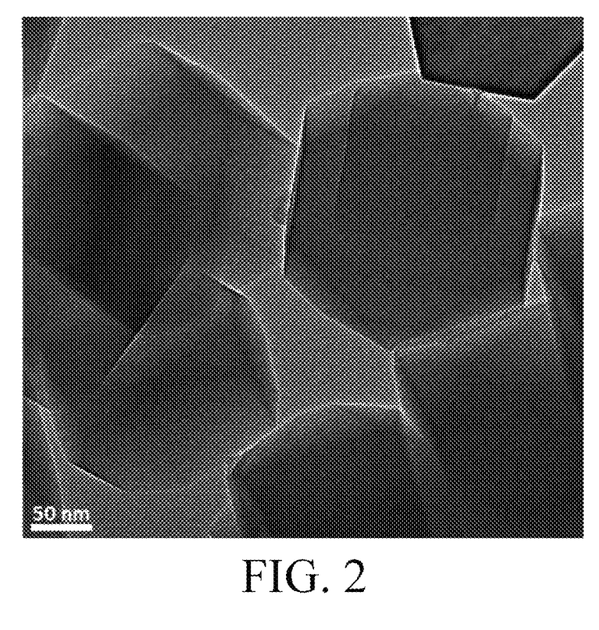
FIG. 2 is a transmission electron microscope (TEM) image of the porous material of Embodiment 4.

In some embodiments, wherein the $Si_aM_bO_x$ is mainly present in the form of at least one of a tetrahedron, a hexahedron and an octahedron formed by Si—Si, Si—O-M and M-M chemical bonds. Refer to FIG. 1, which is an example of a molecular structure model diagram of the porous material of the present application. Refer to FIG. 2, which shows a hexahedral structure of the porous material of Embodiment 2.

Figure 5:
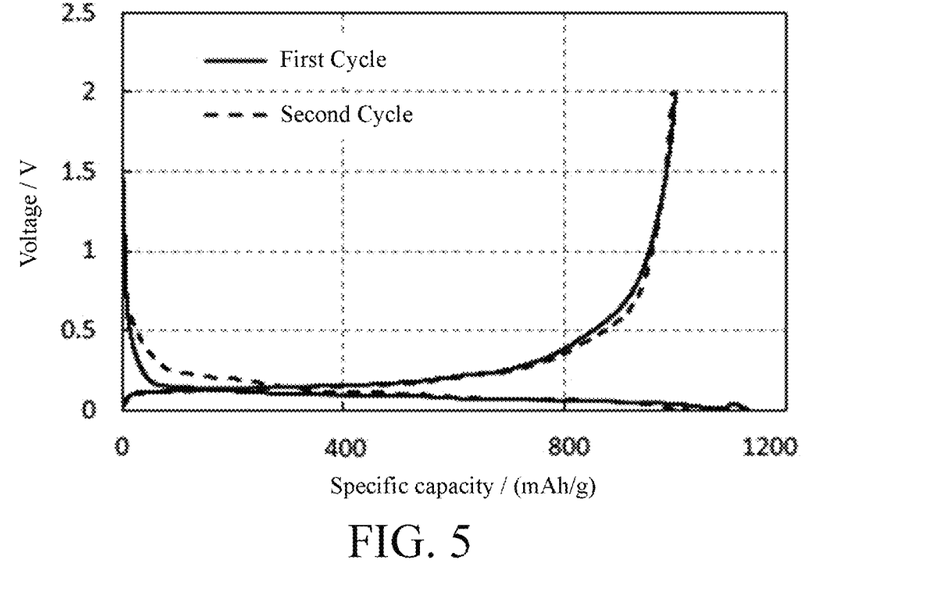
FIG. 5 is a view showing the first and second charge and discharge capacities of a button lithium ion battery of Embodiment 2.

On the one hand, the $Si_aM_bO_x$ of the present application contains a large amount of pore structure (the pore capacity is about 0.25 cm$^3$/g to about 0.6 cm$^3$/g), which can increase the diffusion rate of lithium ions in the $Si_aM_bO_x$ material and reduce the polarization internal resistance. Further, the porous structure in $Si_aM_bO_x$ can also provide a buffer space for the volume expansion of the silicon-oxygen material during the cycle lithium intercalation process. In addition, a large number of micropores and/or mesopores in the $Si_aM_bO_x$ of the present application can also reduce the contact of organic components in the electrolyte with an inner $SiO_2$ material, reduce the loss of irreversible capacity of the lithium ion battery prepared therefrom during the first cycle, and improve the first coulombic efficiency of the lithium ion battery. On the other hand, the aforementioned skeleton structure of the $Si_aM_bO_x$ of the present application can ensure the stability of the material. The doping of an appropriate amount of one or more elements such as Al, Si, P, Mg, Ti and Zr into the skeleton structure is advantageous for increasing the first coulombic efficiency of the lithium ion battery prepared therefrom, mainly because that the doping element increases the particle size of the material, thereby reducing the specific surface area of the material. For example, refer to FIG. 5, which shows that the doped material having the micro/mesoporous structure obtained in Embodiment 2 has very good cycle stability and high first coulombic efficiency.

Figure 4:
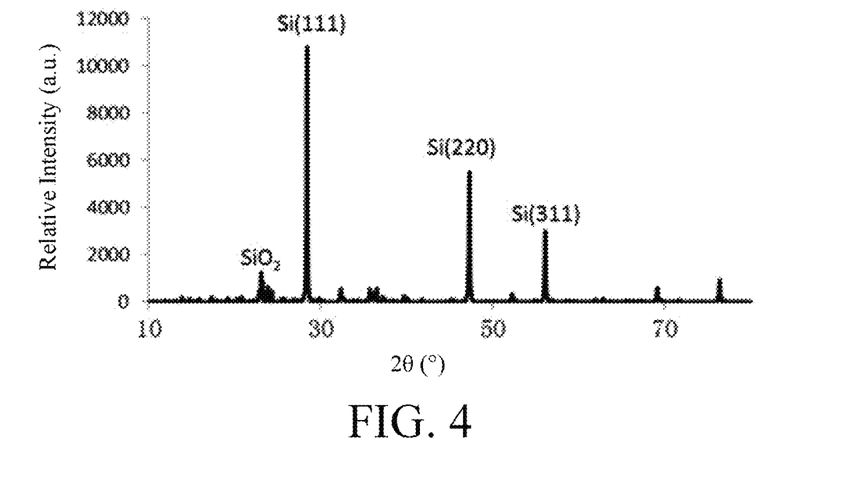
FIG. 4 is an X-ray diffraction (XRD) spectrum of the porous material of Embodiment 2.

In some embodiments, the $Si_aM_bO_x$ is mainly composed of Si, $SiO_2$ and $MO_x$, wherein $MO_x$ is mainly present in an amorphous form. Amorphous $MO_x$ can reduce the volume expansion caused by the lithium deintercalation process, thereby further optimizing the electrochemical performance of the lithium ion battery prepared therefrom. Refer to FIG. 4, which is an X-ray diffraction (XRD) spectrum of the porous material of Embodiment 2. It can be seen from FIG. 4 that the XRD spectrum of $Si_aM_bO_x$ are mainly characteristic peaks of $SiO_2$ and Si, and no peaks containing $MO_x$ oxides appear, which proves that $MO_x$ is mainly present in an amorphous form.

In some embodiments, the particle size of the $Si_aM_bO_x$ is about 200 nm-about 3 μm. In some embodiments, the particle size of the $Si_aM_bO_x$ may be about 400 nm, about 600 nm, about 800 nm, about 1 μm, about 1.2 μm, about 1.4 μm, about 1.6 μm, about 1.8 μm, about 2.0 μm, about 2.2 μm, about 2.4 μm, about 2.6 μm, about 2.8 μm, and the like. In some embodiments, the particle size of the $Si_aM_bO_x$ is about 500 nm-about 700 nm. Refer to FIG. 2, which is a transmission electron microscope (TEM) image of a porous material of Embodiment 4. The particle size of the material may be measured by a Malvern particle size tester: the material is dispersed in a dispersing agent (ethanol or acetone, or other surfactants), and after 30 min of ultrasound, a sample is added to the Malvern particle size tester to start the test.

In some embodiments, the ratio of a to b is about 9-about 100. In some embodiments, the ratio of a to b is about 10-about 25. In some embodiments, the ratio of a to b is about 12, about 14, about 16, about 18, about 20, or the like.

II. Preparation Method of the Porous Material

The present application provides a method for preparing any of the foregoing porous materials, including:

step 1: mixing a silicon source with an organic template to obtain a first solution;

step 2: mixing a doping element precursor with deionized water to obtain a second solution, and adding the second solution dropwise to the first solution to obtain a third solution;

step 3: placing the third solution in a reaction vessel for a hydrothermal reaction for about 1 day-about 5 days, and drying and calcining the hydrothermal reaction product;

step 4: mixing the calcined product of step 3 with magnesium powder, and calcining the mixture under an inert atmosphere; and step 5: performing acid-washing, water-washing, vacuum-drying and sieving on the calcined product of step 4 to obtain $Si_aM_bO_x$, wherein the masses of the silicon source, the doping element precursor and the magnesium powder are selected to meet the base stoichiometric ratio of the $Si_aM_bO_x$ as described in any of the foregoing, and wherein the mass of the organic template is selected to meet the particle size range and pore size range of the $Si_aM_bO_x$ as described in any of the foregoing.

In some embodiments, wherein the organic template includes at least one selected from the group consisting of tetrapropylammonium hydroxide, tetramethylammonium hydroxide, tetraethylammonium hydroxide, triethylamine, polyethylene oxide-polypropylene oxide-polyethylene oxide triblock copolymer, tetrapropylammonium bromide, hexamethylenediamine and amantadine. In some embodiments, the organic template is tetrapropylammonium hydroxide.

In some embodiments, the mass ratio of the hydrothermal reaction product to the magnesium powder is about 1:0.2 to about 1:0.8.

In some embodiments, the mass ratio of the hydrothermal reaction product to the magnesium powder is about 1:0.4 to about 1:0.6.

In some embodiments, the silicon source in step 1 includes at least one selected from the group consisting of tetraethyl orthosilicate, sodium silicate, tetramethoxysilane, polysiloxane, silica and the like.

In some embodiments, the first solution and the third solution in step 1 and step 2 are stirred at about 20° C.-about 45° C. for about 0.5 h-about 6 h.

In some embodiments, the doping element in step 2 includes at least one selected from the group consisting of Al, Si, P, Mg, Ti and Zr. In some embodiments, the doping element precursor includes at least one selected from the group consisting of aluminum isopropoxide, aluminum hydroxide, tetraethyl ortho silicate, titanium tetraisopropanolate, phosphoric acid, magnesium sulfate, zirconium n-butoxide, zirconium isopropoxide and the like. In some embodiments, the molar ratio of Si to the doping element M is about 8-about 10,000. In some embodiments, the molar ratio of Si to M is about 9-about 100. In some embodiments, the molar ratio of Si to M is about 10-about 25.

In some embodiments, the temperature of the hydrothermal reaction in step 3 is about 160° C.-about 200° C., the time of the hydrothermal reaction is about 3 days, and the hydrothermal reaction product is dried, placed in the calcining furnace, heated at the heating rate of about 0.1° C./min-about 3° C./min to about 550° C.-about 700° C. and calcined for about 2 h-about 24 h. In some embodiments, the drying of the hydrothermal reaction product includes suction filtration, water washing, and drying in an oven at about 100° C. for about 12 h.

In some embodiments, the inert atmosphere in step 4 is nitrogen, argon or helium, and the mixture of the calcined product of step 3 and the magnesium powder is placed in the calcining furnace, heated at the heating rate of about 0.1° C./min-about 3° C./min to about 550° C.-about 700° C. and calcined for about 2 h-about 24 h.

In some embodiments, the acid-washing in step 5 is performed by immersing the calcined product of step 4 in about 0.1M-about 2M hydrochloric acid for about 5 h-about 24 h and about 400 mesh is adopted for the sieving. In some embodiments, the acid-washing in step 5 is performed by immersing and stirring the calcined product of step 4 in an excess of about 1M hydrochloric acid for about 10 h, and after suction filtration and water washing, drying the product in a vacuum oven at about 60° C. for about 12 h.

III. Anode

The present application provides an anode, including an anode current collector and an anode active material layer disposed on at least one surface of the anode current collector, wherein the anode active material layer includes the material according to any of the foregoing porous materials.

In some embodiments of the present application, the anode current collector may be, but is not limited to, copper foil or nickel foil.

IV. Electrochemical Device

The present application provides an electrochemical device, including a cathode, a separator, an electrolyte and the foregoing anode.

In some embodiments, the electrochemical device of the present application includes, but is not limited to, all types of primary batteries, secondary batteries, fuel cells, solar cells or capacitors. In some embodiments, the electrochemical device is a lithium secondary battery. In some embodiments, the lithium secondary battery includes, but is not limited to, a lithium metal secondary battery, a lithium ion secondary battery, a lithium polymer secondary battery or a lithium ion polymer secondary battery.

In some embodiments, the electrochemical device is a lithium ion battery and is prepared using the following method:

Preparation of anode: an anode active material (i.e., any of the foregoing porous materials), a conductive material and an anode binder are dispersed in a solvent system according to a certain mass ratio, an obtained mixture is sufficiently stirred and uniformly mixed, and then applied to an anode current collector, after drying and cold pressing, an anode is obtained.

Preparation of cathode: a cathode active material (lithium cobalt oxide, lithium manganate, lithium iron phosphate or the like), a conductive material and a cathode binder are dispersed in a solvent system according to a certain mass ratio, an obtained mixture is sufficiently stirred and uniformly mixed, and then applied to a cathode current collector, after drying and cold pressing, a cathode is obtained.

In some embodiments, the conductive material improves the electrical conductivity of the active material by providing a conductive path to the active material. The conductive material may include at least one of acetylene black, Ketjen black, natural graphite, carbon black, carbon fiber, metal powder or metal fiber (for example, copper, nickel, aluminum or silver), but examples of the conductive material are not limited thereto. Any suitable conductive material that can be utilized in the art can be used. In some embodiments, the amount of the conductive material can be appropriately adjusted. The amount of the conductive material ranges from about 1 part by weight to about 30 parts by weight based on 100 parts by weight of the cathode active material, the conductive material, and the binder.

In some embodiments, examples of the solvent include N-methylpyrrolidone, acetone or water, but the disclosure is not limited thereto, and any suitable solvent available in the art may be used. In some embodiments, the amount of the solvent may be suitably adjusted.

In some embodiments, the binder may help the bonding between the active material and the conductive material or help the bonding between the active material and a current collector. Embodiments of the binder include polyvinylidene fluoride, polyvinylidene chloride, carboxymethylcellulose, polyvinyl acetate, polyvinylpyrrolidone, polypropylene, polyethylene, and various polymers, but the present disclosure is not limited thereto. Any suitable binder available in the art may be used. The amount of the binder ranges from about 1 to about 30 parts by weight based on 100 parts by weight of the active material, the conductive material, and the binder.

In some embodiments, the current collector has a thickness in the range of about 3 microns to about 20 microns, but the disclosure is not limited thereto. The current collector is not particularly limited as long as the current collector is electrically conductive without causing adverse chemical changes in the manufactured battery. Embodiments of the current collector include copper, stainless steel, aluminum, nickel, titanium, or an alloy (for example, a copper-nickel alloy), but the disclosure is not limited thereto. In some embodiments, fine irregularities (for example, surface roughness) may be included the surface of the current collector to enhance the adhesion of the surface of the current collector to the active material. In some embodiments, the current collector may be used in a variety of forms, and the embodiments of the current collector include membranes, pieces, foils, meshes, porous structures, foams, or nonwovens, but the disclosure is not limited thereto.

Separator: a polyethylene (PE) porous polymeric film is used as the separator. The material of the separator may include glass fiber, polyester, polyethylene, polypropylene, polytetrafluoroethylene or a combination thereof. The pores in the separator have a diameter ranging from about 0.01 microns to about 1 micron, and the thickness of the separator is in the range from about 5 microns to about 500 microns.

Electrolyte: the electrolyte includes an organic solvent, a lithium salt and an additive. The organic solvent includes at least one of ethylene carbonate (EC), propylene carbonate (PC), diethyl carbonate (DEC), ethyl methyl carbonate (EMC), dimethyl carbonate (DMC), propylene carbonate and ethyl propionate. The lithium salt includes at least one of an organic lithium salt or an inorganic lithium salt. The lithium salt includes at least one of lithium hexafluorophosphate ($LiPF_6$), lithium tetrafluoroborate ($LiBF_4$), lithium difluorophosphate ($LiPO_2F_2$), lithium bis(trifluoromethanesulfonyl)imide $LiN(CF_3SO_2)_2$(LiTFSI), lithium bis(fluorosulfonyl)imide $Li(N(SO_2F)_2)$(LiFSI), lithium bis(oxalato)borate $LiB(C_2O_4)_2$(LiBOB) and lithium difluoro(oxalato)borate $LiBF_2(C_2O_4)$ (LiDFOB).

The cathode, the separator, and the anode are stacked in this order, so that the separator is between the cathode and anode to play a role of isolation, and are wound to obtain a bare battery cell. The wound bare battery cell is placed in an outer package, and is packaged after injecting the electrolyte, and a complete battery cell is obtained through technological processes such as formation, degassing, and trimming.

V. Electronic Device

The present application provides an electronic device, including the electrochemical device according to the foregoing.

In some embodiments of the present application, the electronic device can include, but is not limited to, notebook computers, pen input computers, mobile computers, e-book players, portable telephones, portable fax machines, portable copy machines, portable printers, headsets, stereo headphones, VCRs, LCD TVs, portable cleaners, portable CD players, mini disc players, transceivers, electronic notebooks, calculators, memory cards, portable recorders, radios, backup power supplies, motors, cars, motorcycles, power bicycles, bicycles, lighting fixtures, toys, game consoles, clocks, power tools, flashlights, cameras, large household batteries, lithium ion capacitors, etc.

VI. Embodiments

The present application will be further described in detail below with reference to the embodiments. However, it should be understood that the following embodiments are merely examples, and the embodiments of the present application are not limited thereto.

1. Preparation of Porous Material $Si_aM_bO_x$

Embodiment 1

Step 1: 190 g of tetraethyl orthosilicate (TEOS) was mixed with 180 g of tetrapropylammonium hydroxide, and the foregoing mixture was stirred at 35° C. for 3 h to obtain a first solution.

Step 2: 28.28 g of aluminum isopropoxide was mixed and stirred with 100 ml of deionized water for 2 h to obtain a second solution; and then the second solution was slowly added dropwise to the first solution, and after the dropwise addition, the mixed solution was stirred at 35° C. for 3 h to obtain a third solution.

Step 3: the third solution was transferred to a 500 ml polytetrafluoroethylene reactor and subjected to a hydrothermal reaction at 180° C. for 3 days; a hydrothermal reaction product was subjected to suction filtration, water-washing, and drying in an oven at 100° C. for 12 h to obtain a dried hydrothermal reaction product; and the dried hydrothermal reaction product was placed in a box type furnace, heated at a heating rate of 1° C./min to 600° C. in an air atmosphere, and calcined for 4 h.

Step 4: an oxide obtained by calcination in step 3 was mixed with magnesium powder in a mass ratio of 1:0.6, and then the mixture was placed in an $N_2$ atmosphere, heated at a heating rate of 1° C./min to 650° C., and calcined for 7 h.

Step 5: a calcined product obtained in step 4 was immersed and stirred in an excess of 1M HCl for 10 h, was subjected to suction filtration, water-washing, and drying in a vacuum oven at 60° C. for 12 h, and finally sieved through 400 mesh to obtain a porous $Si_8AlO_{8.2}$ material.

Embodiment 2

The preparation method was substantially the same as that of Embodiment 1, except that 15.52 g of aluminum isopropoxide was weighed in step 2 so as to finally obtain a porous $Si_{12}AlO_{13.8}$ material.

Embodiment 3

The preparation method was substantially the same as that of Embodiment 2, except that 11.64 g of aluminum isopropoxide was weighed in step 2 so as to finally obtain a porous $Si_{16}AlO_{19.1}$ material.

Embodiment 4

The preparation method was substantially the same as that of Embodiment 2, except that 9.31 g of aluminum isopropoxide was weighed in step 2 so as to finally obtain a porous $Si_{20}AlO_{25.3}$ material.

Embodiment 5

The preparation method was substantially the same as that of Embodiment 2, except that 7.45 g of aluminum isopropoxide was weighed in step 2 so as to finally obtain a porous $Si_{25}AlO_{34}$ material.

Embodiment 6

The preparation method was substantially the same as that of Embodiment 2, except that the mass ratio of the oxide obtained by calcination to the magnesium powder in step 4 was controlled to be 1:0.1 so as to finally obtain a porous $Si_{12}AlO_{17.8}$ material.

Embodiment 7

The preparation method was substantially the same as that of Embodiment 2, except that the mass ratio of the oxide obtained by calcination to the magnesium powder in step 4 was controlled to be 1:0.4 so as to finally obtain a porous $Si_{12}AlO_{16.7}$ material.

Embodiment 8

The preparation method was substantially the same as that of Embodiment 2, except that the mass ratio of the oxide obtained by calcination to the magnesium powder in step 4 was controlled to be 1:0.8 so as to finally obtain a porous $Si_{12}AlO_{8.3}$ material.

Embodiment 9

The preparation method was substantially the same as that of Embodiment 2, except that 180 g of tetrapropylammonium hydroxide in step 1 was replaced with 180 g of triethylamine so as to finally obtain a porous $Si_{12}AlO_{13.3}$ material.

Embodiment 10

The preparation method was substantially the same as that of Embodiment 2, except that 180 g of tetrapropylammonium hydroxide in step 1 was replaced with 180 g of tetramethylammonium hydroxide so as to finally obtain a porous $Si_{12}AlO_{13.8}$ material.

Embodiment 11

The preparation method was substantially the same as that of Embodiment 2, except that 180 g of tetrapropylammonium hydroxide in step 1 was replaced with 180 g of tetraethylammonium hydroxide so as to finally obtain a porous $Si_{12}AlO_{13.8}$ material.

Embodiment 12

The preparation method was substantially the same as that of Embodiment 2, except that 180 g of tetrapropylammonium hydroxide in step 1 was replaced with 180 g of P123 (polyethylene oxide-polypropylene oxide-polyethylene oxide triblock copolymer) so as to finally obtain a porous $Si_{12}AlO_{13.8}$ material.

Embodiment 13

The preparation method was substantially the same as that of Embodiment 2, except that 180 g of tetrapropylammonium hydroxide in step 1 was replaced with 180 g of tetrapropylammonium bromide so as to finally obtain a porous $Si_{12}AlO_{13.8}$ material.

Embodiment 14

The preparation method was substantially the same as that of Embodiment 2, except that 180 g of tetrapropylammonium hydroxide in step 1 was replaced with 180 g of hexamethylenediamine so as to finally obtain a porous $Si_{12}AlO_{13.8}$ material.

Comparative Example 1

The preparation method was substantially the same as that of Embodiment 2, except that there was no step 2; that is, no doping element was added. A porous $SiO_{1.4}$ material was finally obtained.

Comparative Example 2

The preparation method was substantially the same as that of Embodiment 2, except that there were no steps 2, 4 and 5; that is, no doping element was added, and the hydrothermal reaction product was not reduced by the magnesium powder and there were no corresponding steps of acid-washing, water-washing and drying after the magnesium thermal reduction. A porous $SiO_2$ material was finally obtained.

Comparative Example 3

The preparation method was substantially the same as that of Embodiment 2, except that the solution of step 2 was directly added dropwise to 190 g of tetraethyl orthosilicate (TEOS) solution; that is, the organic template in step 1 was not added. A mesoporous $Si_{12}AlO_{13.8}$ material was finally obtained.

Comparative Example 4

The preparation method was substantially the same as that of Embodiment 2, except that 180 g of tetrapropylammonium hydroxide in step 1 was replaced with 180 g of P123 (polyethylene oxide-polypropylene oxide-polyethylene oxide triblock copolymer) and there was no step 2; that is, no doping element was added. A mesoporous $SiO_{1.4}$ material was finally obtained.

Briefly, Embodiments 1 and 3-14 employed substantially the same preparation method as that in Embodiment 2, except that the amount of the doping element precursor was different, the amount of the reducing agent magnesium powder was different, and the type of the organic template was different. Specifically, different masses of the doping element precursor were respectively used in Embodiments 1-5; different masses of the reducing agent magnesium powder were respectively used in Embodiment 2 and Embodiments 6-8; and different types of organic templates were respectively used in Embodiment 2 and Embodiments 9-14.

Comparative Examples 1-4 employed substantially the same preparation method as that in Embodiment 2, except that: in Comparative Example 1, the silicon-oxygen material was not doped; in Comparative Example 2, the silicon-oxygen material was not doped, and the silicon-oxygen material was not reduced; in Comparative Example 3, no organic template was added; and in Comparative Example 4, different types of organic templates were used, and the silicon-oxygen material was not doped.

In order to test the electrochemical performance of the materials in Embodiments 1-14 and Comparative Examples 1-4, lithium ion batteries were prepared according to the following methods using the materials prepared above, and the prepared lithium ion batteries were tested.

Preparation of the Button Lithium Ion Battery:
Preparation of cathode: A lithium metal sheet was used as a counter electrode.
Preparation of anode: An active material (the material prepared above), conductive carbon black and a binder polyacrylic acid (PAA) were thoroughly stirred and uniformly mixed in a mass ratio of 90:5:5 in a deionized water solvent system, an obtained mixture was coated on 10 μm copper foil with a 100 μm doctor blade, dried in a vacuum drying oven at 85° C. for 12 h, and punched into a disk with the diameter of 1 cm in a glove box.
Separator: A polyethylene (PE) porous polymeric film was used as the separator.
Preparation of electrolyte: 1 mol/L $LiPF_6$ was added to a solvent with the volume ratio of dimethyl carbonate:ethylene carbonate:ethyl methyl carbonate being 1:1:1.
In the vacuum glove box, a button lithium ion battery was assembled according to the following steps: foamed nickel, a gasket and the anode were sequentially stacked in an anode case, an electrolyte was added dropwise to the anode, the separator was stacked on the anode, the electrolyte was added dropwise to the separator, and the cathode was stacked on the separator, a cathode case was covered on the cathode to obtain the button lithium ion battery.

Preparation of the Lithium Ion Battery
Preparation of cathode: An active material lithium cobalt oxide $LiCoO_2$, a binder polyvinylidene fluoride (PVDF), conductive carbon black and carbon nanotube CNT were sufficiently stirred and uniformly mixed according to a mass ratio of 97.9:1.2:0.4:0.5 in an N-methylpyrrolidone solvent system, and an obtained mixture was coated on an Al foil, dried, and cold pressed to obtain the cathode.

Preparation of anode: An active material (mixed powder of the material in the above-mentioned embodiments and comparative examples and graphite, wherein the ratio of the mixed powder was designed according to a mixing capacity per gram of 450 mAh/g), conductive agent acetylene black and binder polyacrylic acid (PAA) were thoroughly stirred and uniformly mixed in a mass ratio of 95:1.2:3.8 in a deionized water solvent system, and an obtained mixture was coated on Cu foil, dried, and cold pressed to obtain the anode.

Separator: A polyethylene (PE) porous polymeric film was used as the separator.

Preparation of electrolyte: 1 mol/L $LiPF_6$ was added to a solvent of dimethyl carbonate:ethylene carbonate:ethyl methyl carbonate in a ratio of 1:1:1.

The cathode, the separator, and the anode were stacked in order, so that the separator was between the cathode and the anode to play the role of isolator, and was wound. The wound bare battery cell was placed in an outer package, and was packaged after injecting the prepared base electrolyte, and a lithium ion battery was obtained through technological processes such as formation, degassing, and trimming Performance Tests Transmission electron microscopy (TEM) is used to project an accelerated and concentrated electron beam onto a very thin sample such that electrons collide with atoms in the sample to change direction, resulting in solid angle scattering. The size of the scattering angle is related to the density and thickness of the sample, so that images with different shading values can be formed. In this experiment, a JEOL JEM-2010 transmission electron microscope was used, and the operating voltage was 200 kV. A small sample amount was taken, ultrasonically dispersed with anhydrous ethanol, added dropwise to a copper mesh of a porous carbon film with the diameter of 3 mm, and dried in an oven at 60° C. for 15 min to evaporate the ethanol Test for Pore Size and Specific Surface Area The specific surface area, material pore volume, and pore size distribution were determined by an $N_2$ adsorption method using an ASAP 2010 physical adsorption instrument (Micromeritics, USA). About 3 g-about 6 g of sample was loaded into a sample tube, treated at about 250° C. under vacuum (<20 Pa) for about 2 hours, then heated and evacuated, the sample was cooled to room temperature and removed, the masses of the sample and the sample tube were measured, and then were loaded into an analysis station to be analyzed for data processing and calculation.

First Coulombic Efficiency

The battery was charged at a constant current of 0.5 C to 4.45 V, and further charged at a constant voltage of 4.45 V to a current of less than 0.025 C to obtain a charge capacity C0 of the lithium ion battery. After standing for 5 minutes, the battery was discharged at a constant current of 0.5 C to 3.0 V to obtain a discharge capacity D0 of the lithium ion battery. D0/C0 was the first coulombic efficiency of the lithium ion battery.

Performance Test of the Button Lithium Ion Battery

In addition to testing the first coulombic efficiency described above, a LAND system was adopted to perform the charge and discharge test on the button lithium ion battery to test the first reversible capacity.

First Reversible Capacity

The battery was discharged at a constant current of 0.05 C to 0.005 V, allowed to stand for 5 min, discharged at a constant current of 50 µA to 0.005 V, allowed to stand for 5 min, discharged at a constant current of 10 µA to 0.005 V, and allowed to stand for 5 min to obtain a discharge capacity D0 of the button battery. The battery was charged at a constant current of 0.05 C to 2 V to obtain a charge capacity C0. C0/D0 was the first reversible capacity of the button battery.

Performance Test of the Lithium Ion Battery

In addition to testing the first coulombic efficiency described above, the rate performance and the capacity retention rate and the expansion rate at the 400th cycle of the lithium ion battery were further tested.

Discharge Rate Test (1) In a 25° C. environment, the battery was discharged at a constant current of 0.2 C to 3.0 V, and allowed to stand for 5 minutes. (2) The battery was charged at a constant current of 0.5 C to 4.45 V, charged at a constant voltage of 4.45 V to a current of less than 0.05 C, and allowed to stand for 5 minutes. (3) The battery was discharged at a rate of 0.2 C to 3.0 V to obtain a discharge capacity at the discharge rate of 0.2 C. (4) By repeating the foregoing steps (2)-(3) and adjusting the discharge rate in step (3) to 0.5 C, 1 C, 1.5 C and 2.0 C respectively, discharge capacities at different discharge rates were obtained.

A ratio of the discharge capacity obtained at each rate to the discharge capacity obtained at the rate of 0.2 C was obtained to compare the rate performance.

The discharge capacity obtained at the rate of 2.0 C was recorded as D1. After discharging at the rate of 2.0 C, the battery was then subjected to a 0.2 C rate discharge test, and the obtained discharge capacity was recorded as D0, wherein D1/D0 was the capacity recovery of the battery at the rate of 0.2 C after 2 C rate discharge.

Cycle Performance Test

Interval Cycle is a unique cycle test, which is mainly carried out by a combination of charge and discharge and storage, that is, after one charge and discharge, the battery was stored, and then subjected to the charge and discharge test, which was one cycle. The test process is as follows:

In a 25° C. environment, the battery was charged at a constant current of 0.5 C to 4.45 V, charged at a constant voltage of 4.45 V to a current of less than 0.025 C, allowed to stand for 5 minutes, and discharged at a rate of 0.5 C to 3.0 V, wherein the discharge capacity obtained in this step was the initial discharge capacity. The above steps were repeated to perform a 0.5 C rate charge/0.5 C rate discharge cycle test, and the ratio of the discharge capacity of each step to the initial discharge capacity was obtained to obtain the capacity retention rate under each cycle. The specific calculation formula is as follows:

$$\text{Capacity retention rate at the } N\text{th cycle} = (\text{discharge capacity at the } N\text{th cycle/discharge capacity at the first cycle}) \times 100\%.$$

Full Charge Expansion Ratio Test of Lithium Ion Battery

The thickness of the initial half-charged lithium ion battery was tested using a spiral micrometer. At the 400th cycle, when the lithium ion battery was in a fully charged state, the thickness of the lithium ion battery was tested with the spiral micrometer, and compared with the thickness of the lithium ion battery in the initial half-charged state to obtain the expansion ratio of the fully charged lithium ion battery at this time.

The pore size, specific surface area (BET) and particle size of the materials in Embodiments 1-14 and Comparative Examples 1-4, as well as the first reversible capacity (2 V) and first coulombic efficiency of the button lithium ion battery prepared from the materials are given in Table 1 below.

TABLE 1

| EMBODIMENTS | Average Pore Size (nm) | BET ($m^2/g$) | Average Particle Size (nm) | First Reversible Capacity (2 V) (mAh/g) | First Coulombic Efficiency |
|---|---|---|---|---|---|
| Embodiment 1 | 0.982 | 135.2 | 700 | 1035.5 | 90.1% |
| Embodiment 2 | 0.943 | 147.8 | 500 | 1047.5 | 90.9% |
| Embodiment 3 | 0.835 | 158.9 | 300 | 976.6 | 85.7% |
| Embodiment 4 | 0.827 | 161.7 | 270 | 945.1 | 82.9% |
| Embodiment 5 | 0.831 | 162.2 | 250 | 890.5 | 78.1% |
| Embodiment 6 | 0.948 | 141.0 | 700 | 522.4 | 44.0% |
| Embodiment 7 | 0.944 | 150.2 | 650 | 704.6 | 61.7% |
| Embodiment 8 | 0.942 | 155.0 | 450 | 1061.1 | 92.0% |
| Embodiment 9 | 1.330 | 89.3 | 1000 | 965.7 | 84.5% |
| Embodiment 10 | 0.590 | 187.1 | 420 | 1015.9 | 87.1% |
| Embodiment 11 | 0.760 | 177.1 | 500 | 1010.2 | 88.4% |
| Embodiment 12 | 3.54 | 89.2 | 1000 | 920.1 | 86.1% |
| Embodiment 13 | 12.47 | 68.3 | 1700 | 912.3 | 84.2% |
| Embodiment 14 | 26.90 | 50.9 | 2300 | 420.0 | 78.8% |
| Comparative Example 1 | 0.944 | 204.7 | 230 | 676.6 | 66.1% |
| Comparative Example 2 | 0.941 | 403.5 | 300 | Since no reducing agent treatment was adopted, Si was mainly present in the form of $SiO_2$, and thus no electrochemical activity was exhibited | |
| Comparative Example 3 | 48.10 | 42.1 | 3000 | 311.1 | 76.5% |
| Comparative Example 4 | 13.12 | 65.2 | 1000 | 800.9 | 74.8% |

Table 2 below shows the electrochemical performance of the lithium ion batteries prepared from the materials of Embodiments 1-14 and Comparative Examples 1-4.

TABLE 2

| EMBODIMENTS | First Coulombic Efficiency | Capacity Retention at 400th Cycle (25° C.) | 2 C Discharge Capacity/0.2 C Discharge Capacity | 0.2 C Capacity Recovery after 2 C Discharge 0.2 C/0.2 C | Expansion Ratio at the 400th Cycle (25° C.) |
|---|---|---|---|---|---|
| Embodiment 1 | 89.2% | 89.2% | 89.3% | 96.9% | 6.5% |
| Embodiment 2 | 89.4% | 90.1% | 90.4% | 98.2% | 5.6% |
| Embodiment 3 | 84.2% | 85.0% | 89.5% | 95.1% | 5.8% |
| Embodiment 4 | 82.6% | 84.8% | 89.0% | 95.4% | 5.8% |
| Embodiment 5 | 80.1% | 84.9% | 90.2% | 96.5% | 5.8% |
| Embodiment 6 | The amount of reducing agent was small, and the presence of a large amount of $SiO_2$ caused the low first efficiency and capacity, and there was no need for all battery evaluation, so there was no data | | | | |
| Embodiment 7 | 75.3% | 80.2% | 89.0% | 95.0% | 5.7% |
| Embodiment 8 | 90.1% | 89.0% | 89.6% | 97.2% | 7.2% |
| Embodiment 9 | 88.3% | 85.5% | 90.1% | 94.5% | 6.2% |
| Embodiment 10 | 88.7% | 89.0% | 78.9% | 84.2% | 5.9% |
| Embodiment 11 | 88.2% | 88.7% | 80.1% | 85.0% | 5.6% |
| Embodiment 12 | 87.1% | 86.1% | 89.1% | 92.5% | 6.2% |
| Embodiment 13 | 87.9% | 85.7% | 89.5% | 93.1% | 6.1% |
| Embodiment 14 | 80.2% | 79.4% | 77.7% | 87.1% | 6.9% |
| Comparative Example 1 | 70.3% | 82.3% | 78..3% | 80.0% | 6.9% |
| Comparative Example 2 | Since no reducing agent treatment was adopted, Si was mainly present in the form of $SiO_2$, there was no need for all battery evaluation, so there was no data | | | | |
| Comparative Example 3 | 78.5% | 78% | 71.6% | 86.3% | 7.5% |
| Comparative Example 4 | 70.1% | 76.1% | 70.1% | 82.4% | 8.0% |

As can be seen from Embodiments 1-5 and Comparative Example 1, the addition of the doping element M in the skeleton of the silicon (Si)-based material is advantageous for improving the first coulombic efficiency of the lithium ion battery prepared therefrom. This is mainly because that as the doping element M increases, the particle size of the material increases, effectively reducing the specific surface area of the material. However, as the particle size of the material increases to a certain extent (for example, when the particle size of the material is greater than 4 μm), the lithium ion diffusion path becomes long, which affects the rate performance of the lithium ion battery. Moreover, due to the structural characteristics of the material itself, Si in the skeleton which can be replaced by the doping element M is limited, so the doping amount of the doping element M cannot be infinitely increased. In addition, an increase in the doping element reduces the coordination of O with Si, and the ratio of O to Si, namely x/a, decreases. Therefore, it is very important to choose an appropriate molar ratio of Si to M. In some embodiments of the present application, the molar ratio of Si to M is about 8-about 10,000. In some embodiments, the molar ratio of Si to M is about 9-about 100. In some embodiments, the molar ratio of Si to M is about 10-about 25. In Embodiments 1-5, when the molar ratio of Si to M was about 12, the lithium ion battery prepared therefrom had the best cycle performance and the highest first coulombic efficiency. In addition, although Embodiments 1-5 and Comparative Example 1 have the doping element Al as an example, the present application is not limited thereto. The doping elements such as Si, P, Mg, Ti and Zr may function in the same manner, and the doping element may be any combination of the foregoing doping elements.

As can be seen from Embodiments 2 and 6-8 and Comparative Example 2, the amount of the reducing agent magnesium powder has an important influence on the electrochemical performance of the material. This is mainly because that the amount of the reducing agent magnesium powder has a great influence on the oxygen content in the material: when the amount of the reducing agent is insufficient, a large amount of $SiO_2$ is present in the material, resulting in a low first coulombic efficiency of the lithium ion battery prepared therefrom; when there is no reducing agent at all (see Comparative Example 2), the material is almost completely present in the form of oxide $SiO_2$, so that there is no lithium deintercalation activity; and when the amount of reducing agent is excessive, the oxygen content in the material is low, and the first coulombic efficiency of the lithium ion battery prepared therefrom is improved, but at the same time accompanied by a large volume expansion ratio of the material in the cycle. Therefore, by selecting an appropriate amount of reducing agent, the balance between the first coulombic efficiency of the lithium ion battery prepared therefrom and the volume expansion ratio of the material with the cycle can be adjusted to achieve the best optimization effect. In some embodiments of the present application, the mass ratio of the calcined product to be reduced to the magnesium powder is about 1:0.2 to about 1:0.8. In some embodiments of the present application, the mass ratio of the calcined product to be reduced to the magnesium powder is about 1:0.4 to about 1:0.6. In Embodiments 2 and 6-8 of the present application, when the mass ratio of the calcined product to be reduced to the magnesium powder was about 1:0.6, the material has the best electrochemical performance. In addition, although Embodiments 2 and 6-8 of the present application employ a magnesium thermal reduction method, the present application is not limited thereto. Other reducing agents may also be employed, and the amount of reducing agent may be adjusted in accordance with the foregoing principles.

As can be seen from Examples 2 and 9-14 and Comparative Examples 3 and 4, the addition of the organic template during the synthesis of the material is a key factor to the presence of the microporous structure. Organic templates of different molecular weights and molecular structures form different pore sizes. The larger the molecular weight of the organic template and the more complicated the molecular structure, the larger the pore size of the material prepared therefrom. The study of the present application found that: when the pore size of the material is too large (for example, greater than about 50 nm), the first coulombic efficiency of the lithium ion battery prepared therefrom decreases and the rate performance and battery expansion ratio deteriorate. This is mainly because that the material with a large pore size will also have a large overall size, the lithium ion transport path becomes long, which will affect the rate performance; and as the pore size becomes larger, the pore volume becomes smaller, which causes the reserved expansion space to decrease, so that the battery expansion ratio deteriorates as the cycle progresses. When the pore size of the material is too small (for example, less than about 0.4 nm), the rate performance of the lithium ion battery prepared therefrom deteriorates. This is mainly because that when the pore size is too small, the capillary phenomenon generated at an interface where the anode contacts the electrolyte hinders the transport of lithium ions in the pore size. In addition, since the radius of lithium ions is 0.76 Å, the molecular radius of organic substances in the electrolyte is relatively large (for example, usually 5-10 times that of lithium ions), and the pore size of less than 20 nm and greater than 0.8 nm in the material can effectively prevent the organic component in the electrolyte from reacting with silicon to form a large amount of SEI films without affecting the transport of lithium ions.

Based on the above, the doped $Si_aM_bO_x$ material having a microporous and/or mesoporous structure prepared using the organic template in the present application has a higher first coulombic efficiency, a better rate performance, and a lower battery expansion ratio during cycling, mainly because that the microporous and/or mesoporous structure can provide space for expansion of the material during the cycle, and can inhibit the reaction of the organic macromolecules in the electrolyte with the Si inside the material, which can effectively improve the reversible capacity during the reaction, and nanocrystallization of the microporous material is beneficial to the diffusion of Li ions and significantly improves the rate performance of the silicon-oxygen material; and doping can improve the structural stability of the material.

What are described above are embodiments listed in the present application. However, since the applicant cannot exhaust all the embodiments, all other equivalent embodiments which are obtained based on the teaching of the present application fall within the protective scope of the present application. In summary, the present application provides a method that is simple and easy to implement and suitable for industrial production to prepare an anode material having high rate performance.

References to "some embodiments", "part of embodiments", "one embodiment", "another example", "example", "specific example" or "part of examples" in the whole specification mean that at least one embodiment or example in the application comprises specific features, structures, materials or characteristics described in the embodiments or examples. Thus, the descriptions appear throughout the specification, such as "in some embodiments", "in an embodiment", "in one embodiment", "in another example", "in one example", "in a specific example" or "an example", which does not necessarily refer to the same embodiment or example in the present application. Furthermore, the specific features, structures, materials or characteristics in the descriptions can be combined in any suitable manner in one or more embodiments or examples.

The above description summarizes the features of several embodiments, which will enable those of ordinary skill in the art to understand the various aspects of the present application. Those of ordinary skill in the art can readily take the present application as a basis for designing or modifying other compositions to achieve the same objectives and/or the same advantages as the embodiments herein. It is also to be understood by those of ordinary skill in the art that these equal examples do not depart from the spirit and scope of the present application, and it is possible to make various changes, substitutions and modifications to the present application without departing from the spirit and scope of the present application. Although the methods disclosed herein have been described with reference to the specific operations that are performed in a specific order, it should be understood that these operations can be combined, subdivided, or reordered to form an equivalent method without departing from the teachings of the present application. Therefore, unless otherwise specifically indicated herein, the order and grouping of operations shall not be construed as any limitation on the present application.

What is claimed is:

1. A porous material, comprising a material of formula $Si_aM_bO_x$, wherein the ratio of x to a is about 0.6 to about 1.5, and the ratio of a to b is about 8 to about 10,000, wherein M comprises at least one selected from the group consisting of Al, P, Mg, Ti and Zr, wherein the material comprises micropores mesopores, and wherein the pore size of pores of the material is between about 0.8 nm and about 20 nm.

2. The material according to claim 1, wherein the $Si_aM_bO_x$ is mainly present in the form of at least one of a tetrahedron, a hexahedron and an octahedron formed by Si—Si, Si—O-M and M-M chemical bonds.

3. The material according to claim 1, wherein the $Si_aM_bO_x$ consists essentially of Si, $SiO_2$ and $MO_x$, wherein $MO_x$ is mainly present in an amorphous form.

4. The material according to claim 1, wherein the particle size of the $Si_aM_bO_x$ is about 200 nm to about 3 μm.

5. The material according to claim 1, wherein the ratio of a to b is about 9 to about 100.

6. The material according to claim 1, wherein the ratio of a to b is about 10 to about 25.

7. A method for preparing a porous material comprising a material of formula $Si_aM_bO_x$, wherein the ratio of x to a is about 0.6 to about 1.5, and the ratio of a to b is about 8 to about 10,000, wherein M comprises at least one selected from the group consisting of Al, P, Mg, Ti and Zr, wherein the material comprises micropores and/or mesopores, wherein said method comprises:

step 1: mixing a silicon source with an organic template to obtain a first solution, wherein the organic template is used to promote formation of micropores and/or mesopores upon hydrothermal reaction;

step 2: mixing a precursor of M with deionized water to obtain a second solution, and adding the second solution dropwise to the first solution to obtain a third solution;

step 3: placing the third solution in a reaction vessel for a hydrothermal reaction for 1-5 days, and drying and calcining a hydrothermal reaction product;

step 4: reducing a calcined product of step 3 by mixing with magnesium powder, and calcining the mixture under an inert atmosphere; and step 5: performing acid-washing, water-washing, vacuum-drying and sieving on a calcined product of step 4 to obtain $Si_aM_bO_x$.

8. The method according to claim 7, wherein the pore size of pores of the material is between about 0.5 nm and about 50 nm.

9. The method according to claim 7, wherein the $Si_aM_bO_x$ is mainly present in the form of at least one of a tetrahedron, a hexahedron and an octahedron formed by Si—Si, Si—O-M and M-M chemical bonds.

10. The method according to claim 7, wherein the $Si_aM_bO_x$ consists essentially of Si, $SiO_2$ and $MO_x$, wherein $MO_x$ is mainly present in an amorphous form.

11. The method according to claim 7, wherein the particle size of the $Si_aM_bO_x$ is about 200 nm to about 3 μm.

12. The method according to claim 7, wherein the ratio of a to b is about 9 to about 100.

13. The method according to claim 7, wherein the ratio of a to b is about 10 to about 25.

14. The method according to claim 7, wherein the organic template comprises at least one selected from the group consisting of tetrapropylammonium hydroxide, tetramethylammonium hydroxide, tetraethylammonium hydroxide, triethylamine, polyethylene oxide-polypropylene oxide-polyethylene oxide triblock copolymer, tetrapropylammonium bromide, hexamethylenediamine and amantadine.

15. The method according to claim 7, wherein the mass ratio of the calcined hydrothermal reaction product to the magnesium powder is 1:0.2 to 1:0.8.

16. The method according to claim 7, wherein the silicon source in step 1 comprises at least one selected from the group consisting of tetraethyl orthosilicate, sodium silicate, tetramethoxysilane, polysiloxane and silica;

the first solution and the third solution in step 1 and step 2 are stirred at 20° C.-45° C. for 0.5 h-6 h;

the precursor of M in step 2 comprises at least one selected from the group consisting of aluminum isopropoxide, aluminum hydroxide, titanium tetraisopropanolate, phosphoric acid, magnesium sulfate, zirconium n-butoxide and zirconium isopropoxide;

the temperature of the hydrothermal reaction in step 3 is 160° C.-200° C., and the hydrothermal reaction product is dried, placed in a calcining furnace, heated at a heating rate of 0.1° C./min-3° C./min to 550° C.-700° C. and calcined for 2 h-24 h;

the inert atmosphere in step 4 is nitrogen, argon or helium, and a mixture of the calcined product of step 3 and the magnesium powder is placed in the calcining furnace, heated at a heating rate of 0.1° C./min-3° C./min to 550° C.-700° C. and calcined for 2 h-24 h; and the acid-washing in step 5 is performed by immersing the calcined product of step 4 in 0.1 mol/L-2 mol/L hydrochloric acid for 5 h-24 h and about 400 mesh is adopted for the sieving.

* * * * *